United States Patent Office 3,031,895
Patented May 1, 1962

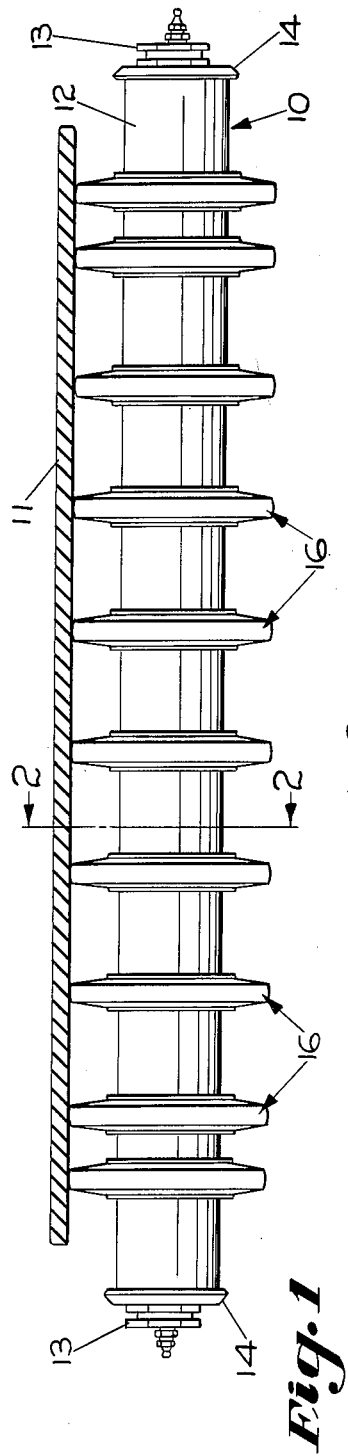
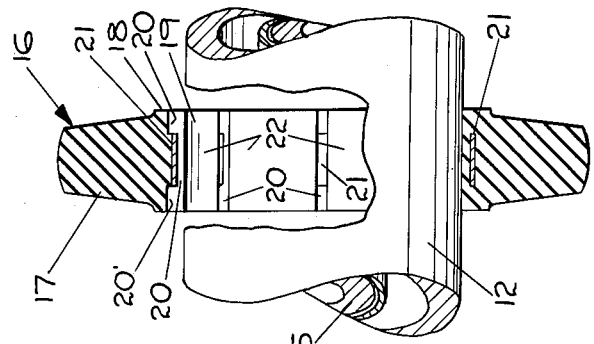
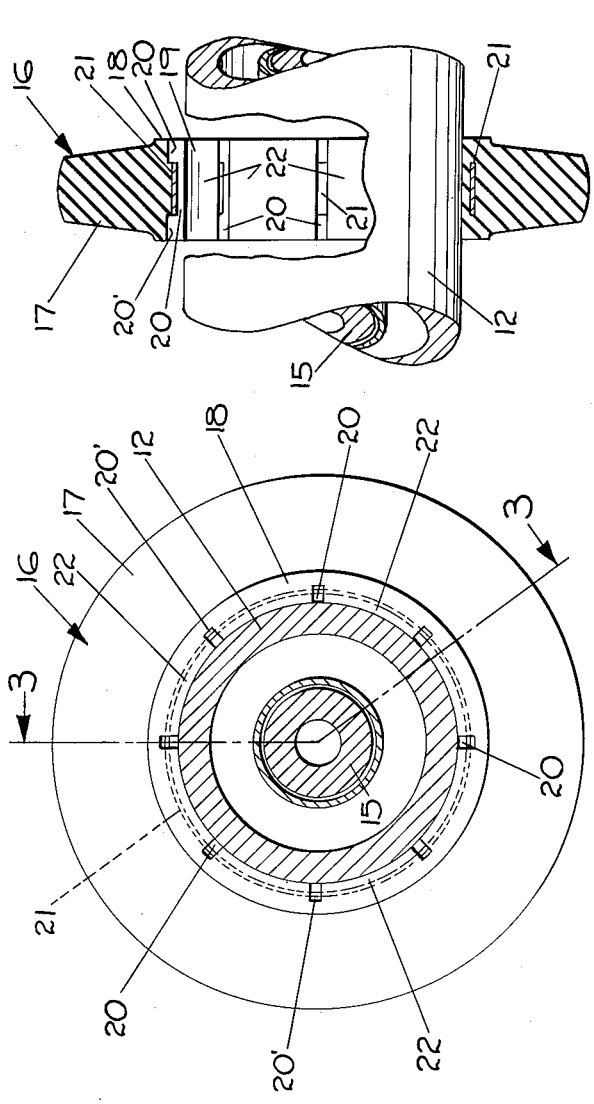
INVENTOR;
ARNIE J. KINDIG,
BY
ATTY.

3,031,895
CONVEYOR IDLER ASSEMBLY
Arnie J. Kindig, Columbus, Ohio, assignor, by mesne assignments, to Jeffrey Galion Manufacturing Company, a corporation of Ohio
Continuation of application Ser. No. 382,736, Sept. 28, 1953. This application Mar. 26, 1957, Ser. No. 648,527
1 Claim. (Cl. 74—230.7)

This invention relates to conveyor idlers which are adapted to support an endless conveyor belt, and more particularly to the assembly of the belt supporting wheel with the shaft of the conveyor idler.

This application is a continuation of patent application, Serial No. 382,736, filed on September 28, 1953, for a Multi-Wheeled Conveyor Roll and Wheel Therefor, now abandoned.

It is a prime object of the instant invention to provide an improved wheel and shaft assembly for a conveyor idler.

It is a further object of the instant invention to provide an improved wheel and shaft assembly for a conveyor idler in which the wheel is adapted to be force-fitted on the shaft and secured in place on the shaft by an interference fit between the wheel and the shaft.

It is another object of the instant invention to provide a novel wheel and shaft assembly for a conveyor idler in which the wheel is formed of resilient material and comprises a non-extensible, rigid cylindrical band embedded in the material of the wheel, and in which some of the material of the wheel disposed between the band and the periphery of the shaft is compressed in fitting the wheel on the shaft to thereby secure the wheel on the shaft by an interference fit.

It is also an object of the instant invention to provide a novel wheel and shaft assembly for a conveyor idler, in which the wheel comprises a body portion and a hub portion, and in which the wheel is assembled on the shaft with an interference fit by compression of the material of the hub portion, and the body portion of wheel is maintained in a stress free condition to absorb the forces of impact loadings on a belt supported by the idler.

Other objects of the invention will appear hereinafter, the novel features and combinations being set forth in the appended claims.

In the accompanying drawings:
FIG. 1 is an elevational view of a conveyor idler constructed in accordance with the instant invention;
FIG. 2 is a sectional view of the conveyor idler shown in FIG. 1, taken on the line 2—2 in FIG. 1; and
FIG. 3 is a sectional view of the wheel and shaft, taken on the line 3—3 in FIG. 2.

The conveyor idler 10, seen in FIG. 1 of the drawings, comprises an elongated, hollow shaft 12 and a plurality of laterally spaced wheels 16 mounted on the periphery of the shaft 12, for supporting a conveyor belt 11. The elongated, hollow shaft 12 is rotatably supported at its opposite ends by anti-friction bearing assemblies, which are placed within the ends of the shaft 12 and mounted on non-rotatable end elements 13, which are adapted to be secured to suitable supporting stands which, in turn, are mounted on the frame of the conveyor. The ends of the shaft 12 also include dirt protector elements 14 for closing the ends of the shaft 12 and preventing the entry of dust and other foreign materials into the ends of the hollow shaft 12 and to the anti-friction bearings enclosed therein. The end elements 13 and the shaft 12, including the anti-friction bearings, are retained in assembly on a centrally disposed fixed shaft 15. The internal construction of the shaft 12 and the bearing assembly is not illustrated in detail herein since it may be of a conventional construction and forms no part of the present invention.

The hollow, elongated shaft 12 carries a plurality of individual, laterally spaced wheels 16 which are assembled on the shaft 12 by being force-fitted axially onto the periphery of the shaft 12 to the desired position along the length of the shaft 12, and retained in assembly therewith by an interference fit between the wheels 16 and the peripheral surface of the shaft 12, as will be explained in greater detail hereinafter.

In the conveyor to which the instant invention has application a plurality of idlers 10 is employed, and these are spaced along the length of the conveyor to support the conveyor belt 11 between the head and foot pulleys of the conveyor. At that position on the conveyor where the materials are loaded onto the conveyor belt 11, the idlers 10 may be spaced closely adjacent each other so that the wheels 16 on the idlers may operate as a cushioning means under the conveyor belt 11, to prevent damage to the belt 11 due to the impact loadings to which it is subjected at the loading station. Also, the wheels 16 on the successive idlers 10 may be spaced differentially along the length of the shafts 12, so that the conveyor belt 11 all across its width will engage one or more of the wheels 16, and the contact of the wheels 16 with the surface of the conveyor belt 11 will operate to clean the belt 11 in a manner known to the art. The instant invention facilitates the assembly of the wheels 16 on the shaft 12, in that the wheels are secured in place on the shaft 12 merely by an interference fit of the material of the wheels 16 and the peripheral surface of the shaft 12 without requiring any special mounting devices, such as collars, screws, etc.

Each of the wheels 16 is of the same construction, and one such wheel 16 is illustrated in detail in FIGS. 2 and 3 of the drawings. In one preferred embodiment, the wheel 16 may be formed by molding of rubber having a hardness of approximately 50 durometer, although it will be understood by those skilled in the art that the wheel may be formed of other materials having like suitable characteristics.

The wheel 16 includes a body portion 17 having a substantially large radial dimension and a hub portion 18 integral therewith. The hub portion 18 includes an axial bore 19 within which the shaft 12 is placed in assembling the wheel 16 on the shaft 12. A non-extensible, rigid, cylindrical band 21, preferably formed of metal, is embedded within the hub portion 18 concentrically with the bore 19. A plurality of parallel walled, axially extending, radial notches 20 are formed in the hub portion 18 and are equally spaced around the bore 19. The non-extensible, rigid band 21 is of smaller axial dimension than the hub portion 18, and the band 21 is centrally located in an axial direction in the hub portion 18, so that the material of the hub portion 18 extends to either side of the band 21. The band 21 is thus embedded within the hub portion 18, and in the process of forming the wheel 16 a bond is formed between the material of the wheel 16 and the surfaces of the band 21.

The notches 20 extend from the bore 19 radially outwardly to the surface of the band 21, and beyond each edge of the band 21 the notches 20 extend further into the hub portion 18, forming offsets 20' which extend radially beyond the band 21. The notches 20 divide that part of the hub portion 18 between the band 21 and the bore 19 into a plurality of individual pads 22 which are operative to engage the peripheral surface of the shaft 12 when the wheel 16 is assembled on the shaft 12. The radial dimension of the pads 22 is relatively small compared to the radial dimension of the body portion 17.

The diameter of the bore 19 in the hub portion 18 is slightly smaller than the external diameter of the hollow shaft 12, in order that the pads 22 around the bore 19 will have an interference fit with the peripheral surface of the shaft 12. For example, in some of the idler assemblies that have been made in accordance with this invention, the external diameter of the wheel 16 was 6.250", the external diameter of the shaft 12 was 3.250" and the internal diameter of bore 19 in the wheel 16 was 3.225" (a difference of .025"); the axial dimension of bore 19 of each wheel 16 was 1.125", the axial dimension of the band 21 was .625", and the internal diameter of the band 21 was 3.50".

When the wheels 16 are to be placed upon the shaft 12, a soap solution on the shaft 12 is employed as a lubricant to reduce the friction between the surfaces of the pads 22 in the bore 19 and the shaft 12, and the wheels 16 are then force-fitted axially onto the shaft 12 to the desired positions along the length of the shaft 12. In assembling the wheels 16 upon the shaft 12 in this manner, the material of the pads 22 between the band 21 and the shaft 12 is compressed in a radial direction, and the forces set up thereby operate to retain the wheel 16 in assembly with the shaft 12 in the desired position without any shifting or creeping of the wheel 16 relatively to the shaft 12.

The notches 20, separating the individual pads 22, permit circumferential flow of the material of the pads 22, when the pads 22 are compressed in assembling the wheel 16 on the shaft 12. However, due to the size of the pads 22, some of the material thereof will tend to flow in a radial and axial direction as well, this flow being absorbed in the material of the hub portion 18 on either side of the wheel 16 beyond the edges of the band 21. Thus, with the band 21 being narrower in an axial direction than the hub 18, and with the band 21 being centrally disposed in the hub 18, the stresses set up by the flow of the material in radial and axial directions, as aforementioned, are directed generally diagonally upwardly and outwardly from approximately the edges of the band 21 so that these stresses are directed away from the body portion 17 of the wheel 16, and do not in any way affect the body portion 17, leaving it in a stress free condition.

The notches 20 are formed with the offsets 20' at their ends in order to further segregate the pads 22 at a depth radially beyond the band 21. This construction provides some added relief from the stresses which are set up in the material of the hub portion 18 due to the compression of the pads 22 by permitting flow of material into the offsets 20'. With this construction of the wheel 16 the compressive stresses set up in assembling the wheel 16 on the shaft 12 are isolated in the hub portion 18 and not transmitted to the body portion 17 of the wheel 16. This is material to the successful operation of the wheel 16.

It will be understood by those skilled in the art that the idler 10, incorporating the wheels 16 of this invention, is adapted to support the conveyor belt 11 at both a loading station, at which the conveyor is subjected to severe impact loadings due to the dumping of materials onto the conveyor belt 11, and also in the run of the conveyor belt 11 wherein the load may bounce along as the conveyor belt travels over the idlers 10, again subjecting the belt 11 to impact loadings. The impact loadings on the conveyor belt 11 are transmitted to the wheels 16 to be absorbed by the body portion 17 thereof. It is for this reason that the body portion 17 is made with the relatively large radial dimension and is formed of shock absorbent material. Further, to increase the useful life of the wheels 16 it is necessary that the body portion 17 be free of any internal stresses which would detrimentally affect the shock absorbing capacity of the body portion 17. In accordance with this invention, the stresses which are set up due to the compression of the material of the pads 22 are isolated in the hub portion 18, thereby achieving the desirable result of maintaining the body portion 17 free of internal stress, and permitting the forces of the impact loadings to be distributed in the body portion of the wheel in radial and circumferential directions.

It is important to note that the cylindrical band 21 is made of a material, preferably metal, which is non-resilient, that is a material which will not stretch or otherwise become deformed to any material degree, whereby the internal diameter of the band 21 will not be materially altered. It is also very desirable that the band 21 be bonded to the hub portion 18 of the wheel 16, in order that there will be no heat generated within the wheel 16 when it is operating to carry a load, by reason of friction between the rubber of the wheel and the material of the band 21. Heat thus generated within a wheel produces a degeneration of the rubber of the wheel, which, of course, is to be avoided.

From the foregoing it will be seen that by this invention there has been provided an improved idler assembly in which a plurality of improved individual wheels are force-fitted upon a shaft, wherein the wheels may be spaced in any desired positions relatively to each other, and in which no special fastening devices or spacers are employed since the wheels are retained in position upon the shaft solely by the friction of the material of the wheel that is compressed between the shaft surface and a non-extensible, rigid band embedded in the wheel.

It will also be seen that by this invention there has been provided an improved individual wheel which is adapted to be forced axially upon a shaft of a conveyor idler assembly, which wheel includes an improved construction in which there is a non-extensible, rigid, cylindrical band embedded in the material of the hub of the wheel, which band is adapted to cooperate with the shaft upon which the wheel is to be force-fitted, to compress the material of the hub, and more specifically the pads formed therein, to fix the wheel upon the shaft.

Obviously those skilled in the art may make various changes in the details and arrangement of parts without departing from the spirit and scope of the invention as defined by the claims hereto appended, and applicant therefore wishes not to be restricted to the precise construction herein disclosed.

Having thus described and shown an embodiment of the invention, what it is desired to secure by Letters Patent of the United States is:

In a conveyor having a conveyor belt, a conveyor belt idler comprising a shaft and a wheel on the shaft for supporting the conveyor belt in its run and absorbing impact loadings on the belt, said wheel comprising a body portion of substantial radial depth formed of yieldable material, the belt engaging the periphery of the wheel for transmission of the impact loadings to the body portion, a hub portion formed integrally with the body portion and having a bore with a diameter which is smaller than the diameter of the shaft for securing the wheel to the shaft by an interference fit between the bore and the shaft, an endless non-extensible, rigid band disposed concentrically with the bore and embedded in the hub portion, said band being narrower in an axial direction than the hub portion, said hub portion including a plurality of pads formed between the band and the bore and having inwardly facing surfaces forming the bore, said pads being disposed circumferentially of the bore, notches extending radially outwardly from the bore to the inner surface of the band and extending the full width of the hub portion to segregate the pads one from the other, the ends of the notches beyond the edges of the band being offset radially into the hub portion beyond the plane of the band, the pads being relatively thin in a radial direction with respect to the depth of the body portion, said pads being compressed between the shaft and the rigid band, said rigid band isolating the pads from the body portion and the compressive stresses set up in the pads by the interference fit between the bore and the shaft being isolated in the hub portion with the body portion being maintained in a substantially stress free condition for absorbing impact loadings and distributing the forces of said impact loadings radially and circumferentially in the body portion only of the wheel.

References Cited in the file of this patent

UNITED STATES PATENTS

| | | |
|---|---|---|
| 684,273 | Leavenworth | Oct. 8, 1901 |
| 2,017,149 | Greening | Oct. 15, 1935 |
| 2,271,166 | Weiss | Jan. 27, 1942 |
| 2,326,670 | Patterson | Aug. 10, 1943 |
| 2,484,752 | Searles | Oct. 11, 1949 |
| 2,701,971 | Carter et al. | Feb. 15, 1955 |